(12) United States Patent
Helkey et al.

(10) Patent No.: US 8,639,069 B1
(45) Date of Patent: Jan. 28, 2014

(54) WAVELENGTH DEPENDENT OPTICAL SWITCH

(75) Inventors: Roger Jonathan Helkey, Montecito, CA (US); John Edward Bowers, Santa Barbara, CA (US); Xuezhe Zheng, Santa Barbara, CA (US); David Welsh, Goleta, CA (US); Robert Anderson, Oxnard, CA (US); Olivier Jerphagnon, Santa Ynez, CA (US)

(73) Assignee: Calient Technologies, Inc., Goleta, CA (US)

( * ) Notice: Subject to any disclaimer, the term of this patent is extended or adjusted under 35 U.S.C. 154(b) by 826 days.

(21) Appl. No.: 10/880,382

(22) Filed: Jun. 28, 2004

Related U.S. Application Data

(60) Provisional application No. 60/484,062, filed on Jun. 30, 2003.

(51) Int. Cl.
| | |
|---|---|
| *G02B 6/26* | (2006.01) |
| *G02B 6/28* | (2006.01) |
| *G02B 6/34* | (2006.01) |
| *G02B 6/42* | (2006.01) |
| *H04J 14/00* | (2006.01) |
| *H04B 10/00* | (2013.01) |

(52) U.S. Cl.
USPC .............. 385/18; 385/16; 385/17; 385/24; 385/37; 398/43; 398/118

(58) Field of Classification Search
USPC .......................................... 385/24
See application file for complete search history.

(56) References Cited

U.S. PATENT DOCUMENTS

| | | | |
|---|---|---|---|
| 4,243,297 A | 1/1981 | Elion | |
| 4,244,045 A | 1/1981 | Nosu et al. | |
| 5,175,777 A | 12/1992 | Bottle | |
| 5,440,654 A | 8/1995 | Lambert | |
| 5,859,717 A | 1/1999 | Scobey et al. | |
| 5,960,133 A | 9/1999 | Tomlinson | |
| 6,097,859 A | 8/2000 | Solgaard et al. | |
| 6,240,222 B1 | 5/2001 | Bergmann | |
| 6,285,500 B1 | 9/2001 | Ranalli et al. | |
| 6,289,145 B1 * | 9/2001 | Solgaard et al. | 385/17 |
| 6,314,115 B1 | 11/2001 | Delfyett et al. | |
| 6,317,529 B1 | 11/2001 | Kashima | |

(Continued)

FOREIGN PATENT DOCUMENTS

WO    WO01/57902 A2    8/2001

OTHER PUBLICATIONS

Dutton, Understanding Optical Communications, Sep. 1998, IBM Corporation, pp. 23-25, 229-233, and 237.*

(Continued)

*Primary Examiner* — Ryan Lepisto
*Assistant Examiner* — Erin Chiem
(74) *Attorney, Agent, or Firm* — Blakely, Sokoloff, Taylor & Zafman LLP

(57) ABSTRACT

A wavelength-selective optical switch for switching arbitrary wavelengths between optical fibers in mesh networks, using interference filters for separating optical wavelengths, and two-dimensional arrays of micromirrors for switching. Broadband switch inputs and outputs are provided for adding and dropping arbitrary wavelengths at each node of the network. A two-stage multiplexer and two-stage demultiplexer are provided to simplify the free-space demultiplexer and multiplexer. Mechanisms are provided that allows full non-blocking functionality in the presence of finite yield of the micromirror arrays.

10 Claims, 19 Drawing Sheets

(56) References Cited

U.S. PATENT DOCUMENTS

| | | | |
|---|---|---|---|
| 6,327,398 B1 | 12/2001 | Solgaard et al. | |
| 6,343,169 B1* | 1/2002 | Dempewolf et al. | 385/37 |
| 6,389,190 B2 | 5/2002 | Sogaard et al. | |
| 6,501,877 B1 | 12/2002 | Weverka et al. | |
| 6,526,195 B1* | 2/2003 | Henshall et al. | 385/18 |
| 6,549,699 B2 | 4/2003 | Belser et al. | |
| 6,643,425 B1 | 11/2003 | Bowers et al. | |
| 6,668,108 B1 | 12/2003 | Helkey et al. | |
| 6,750,995 B2 | 6/2004 | Dickson | |
| 6,922,239 B2* | 7/2005 | Solgaard et al. | 356/326 |
| 7,058,253 B1 | 6/2006 | Novotny | |
| 7,072,539 B2 | 7/2006 | Wu et al. | |
| 7,088,882 B2 | 8/2006 | Ducellier et al. | |
| 7,106,966 B1* | 9/2006 | Lalonde et al. | 398/46 |
| 7,236,660 B2* | 6/2007 | Ducellier et al. | 385/24 |
| 7,254,293 B1 | 8/2007 | Helkey et al. | |
| 7,529,441 B2 | 5/2009 | Helkey et al. | |
| 2002/0154411 A1* | 10/2002 | Zhou | 359/577 |
| 2002/0181046 A1* | 12/2002 | Jeong | 359/124 |
| 2002/0196494 A1* | 12/2002 | McGuire, Jr. | 359/127 |
| 2003/0031406 A1 | 2/2003 | Saida et al. | |
| 2003/0215179 A1* | 11/2003 | Mcguire, Jr. | 385/24 |
| 2004/0008928 A1* | 1/2004 | Gerken et al. | 385/24 |
| 2004/0067014 A1* | 4/2004 | Hollars et al. | 385/33 |
| 2004/0208581 A1* | 10/2004 | Li et al. | 398/85 |
| 2005/0063641 A1 | 3/2005 | Neilson et al. | |

OTHER PUBLICATIONS

Patel, J.S. et al., "Liquid Crystal and Grating-Based Multiple-Wavelength Cross-Connect Switch", IEEE Photonics Technology Letters, vol. 7, No. 5, May 1995, pp. 514-516.

Suzuki, S. et al., "Integrated Multichannel Optical Wavelength Selective Switchse Incorporating and Arrayed-Waveguide Grating Multiplexer and Thermooptic Switches," J. of Lightwave Technology, 16(4), pp. 650-655 (Apr. 1998).

Lin, L.Y. et al., "On the expandability of free-space micromachined optical cross connects," J. Lightwave Technol, vol. 18, pp. 482-489, Apr. 2000.

D.M. Marom, D.M. et al., "Wavelength-selective 1×4 switch for 128 WDM channels at 50 GHz spacing," OFC 2002 PostDeadline papers, FB7-1, (2002).

Zheng, X. et al., "3D MEMS Photonic cross-connect switch design and performance", IEEE Journal of Selected Topics in Quantum Electronics, 9(2), 571-578 (Mar./Apr. 2003).

Tsai, J.C. et al., "1×N2 Wavelength-selective switches with high fill-factor two-axis analog micromirror arrays", OFC 2004, Los Angeles, Paper MF42 (2004). nttp://www.Photonics.ucla.edu/pdf/IPL_UCLA_JCTsai_OFC_2004_id155.pdf.

Tsai, J.C. et al., "Open-Loop Operation of MEMS-Based 1×NWavelength-Selective Switch With Long-Term Stability and Repeatability" IEEE Photonics Technology Letters, 16(4), pp. 1041-1043 (Apr. 2004). http://www.photonics.ucla.edu/pdf/IPL_UCLA_JCTsai_PhotonicsTechnologyLetters_2004_id157.pdf.

J.I. Dadap et al., "Modular MEMS-Based Optical Cross-Connect With Large Port-Count", IEEE Photonics Technology Letters, vol. 15, No. 12, Dec. 2003, pp. 1773-1775.

Nakajima, et al., "Prototype WP-Based Optical Path Cross-Connect Node Using PI-Loss Optical Switches", *IEEE—ECOC'98*, Sep. 20-24, 1998, Madrid, Spain, pp. 251-252.

Lin, Lih Y., et al., "Micro-Electro-Mechanical Systems (MEMS) for WDM Optical-Crossconnect Networks", *IEEE*, AT&T Labs-Research, 100 Schulz Drive, Red Bank, NJ 07701, (1999), 954-957.

* cited by examiner

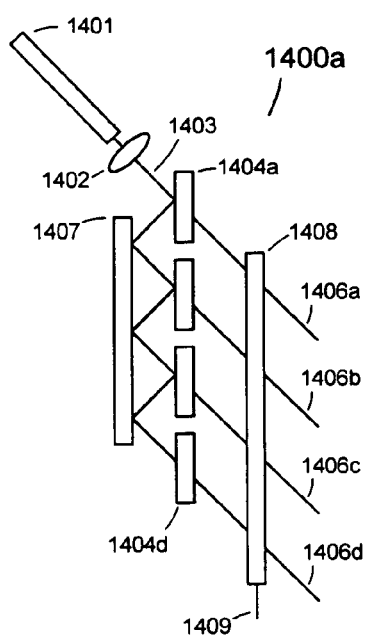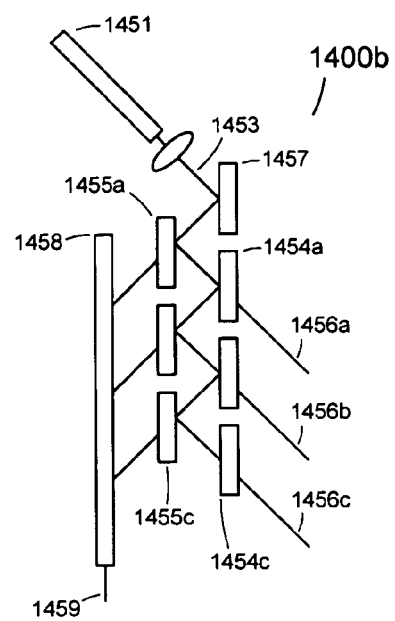
Figure 14a                    Figure 14b

WAVELENGTH DEPENDENT OPTICAL SWITCH

REFERENCE TO RELATED APPLICATION

This application claims the benefit of U.S. Provisional Application No. 60/484,062, filed Jun. 30, 2003, which is herein incorporated by reference.

TECHNICAL FIELD

The present invention relates generally to optical switches and, in particular, to the switching of multiple signals carried on different wavelengths within multiple optical fibers of telecommunications networks.

BACKGROUND

Telecommunications networks traditionally have used rings of optical fibers, where each optical fiber is able to carry a number of digital signals at different optical wavelengths. These fibers are connected to multiplexing and demultiplexing equipment that combine and separate the optical wavelengths. Although in the past these networks have been arranged in rings, higher equipment efficiency and lower equipment cost can be realized using networks arranged in a highly interconnected mesh. Typical mesh nodes might have four to six input and output fibers, each propagating approximately forty wavelengths. Optical switch sizes on the order of 256 input and output ports may be needed to interconnect wavelengths between these nodes, including providing capacity for adding and dropping dozens of signals at each node.

A method for optical wavelength multiplexing and demultiplexing to provide free-space collimated optical beams at separate wavelengths that interface directly with a free-space optical switch is discussed in Patel and Silverberg, Liquid Crystal and Grating-Based Multiple-Wavelength Cross-Connect Switch, IEEE Photonics Technology Letters, Vol. 7, pp. 514-516, 1995 (hereinafter "Patel"), using wavelength-dispersive media such as gratings to separate the optical beams from two input and two output fibers. The number of optical input and outputs ports can be increased over the wavelength dispersive switch method disclosed by Patel using an optical switch composed of a two-dimensional array of micromirrors between two gratings, as disclosed in U.S. Pat. No. 6,097,859 by Solgaard et al. However, short optical path lengths may be needed for robust packaging. Furthermore, wavelength-dispersive media such as gratings may require long optical path lengths to provide sufficient optical beam separation for the closely spaced wavelengths used in conventional telecommunications systems.

It is also difficult to fabricate mirror arrays with perfect yield, leading to blocking network operation in conventional configurations due to defective mirrors in the mirror array. Wavelength independent input and output ports of a wavelength selective switch may be needed in order to provide the ability to add and drop arbitrary wavelengths, as required in mesh telecommunications networks.

BRIEF DESCRIPTION OF THE DRAWINGS

The present invention is illustrated by way of example and not intended to be limited by the figures of the accompanying drawings in which:

FIG. 14a illustrates one embodiment of wavelength optical channel monitoring at an optical input with a partially absorbing photodetector array.

FIG. 14b illustrates an alternative embodiment of wavelength optical channel monitoring with a wavelength selective optical tap.

DETAILED DESCRIPTION

In the following description, numerous specific details are set forth such as examples of specific systems, circuits, components, etc. in order to provide a thorough understanding of embodiments of the present invention. It will be apparent, however, to one skilled in the art that these specific details need not be employed to practice embodiments of the present invention. In other instances, well known components or methods have not been described in detail in order to avoid unnecessarily obscuring embodiments of the present invention. The term "coupled" as used herein means coupled directly to, or indirectly through one or more intervening components. Moreover, "coupled" may mean physically and/or optically coupled as used herein. A line used in a figure may represent a single beam or multiple individual wavelength beams as provided herein. It should also be noted that embodiments of the present invention may be discussed herein in relation to specific frequencies, wavelengths, inputs, outputs, switches, etc., and numbers thereof, only for ease of illustration and are not so limited.

A wavelength-selective optical switch is described. The optical switch may switch arbitrary wavelengths between optical fibers in mesh networks. In one embodiment, the optical switch may use interference filters to separate optical wavelengths. In one embodiment, two-dimensional arrays of micromirrors may be used for switching optical beams. Broadband switch inputs and outputs may be provided for adding and dropping arbitrary wavelengths at each node of the network. A two-stage multiplexer and two-stage demultiplexer may be provided to simplify free-space demultiplexing and multiplexing. Mechanisms may also be provided that allow full non-blocking functionality in the presence of finite yield of the micromirror arrays.

Figure 1:
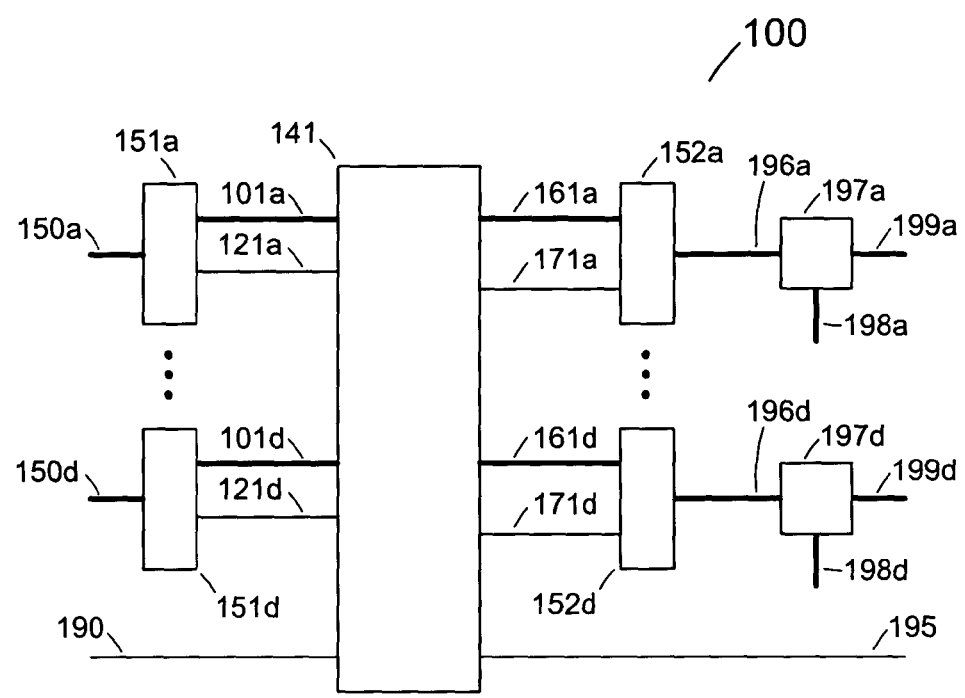
FIG. 1 illustrates one embodiment of a wavelength dependent optical switch.

FIG. 1 illustrates one embodiment of a wavelength dependent optical switch. In this embodiment, optical switch 100 includes four input fibers 150a-150d and four output fibers 199a-199d with each input fiber 150a-150d and each output fiber 199a-199d propagating 40 optical wavelengths spaced apart by, for example, 100 GHz. The wavelengths of the optical signals may be selected to be in the 1.55 μm wavelength telecommunication band, using standard wavelengths as defined by the International Telecommunication Union (ITU). Alternatively, other numbers of wavelengths, frequency spacings and wavelength bands may be used.

In this embodiment, each fiber input propagating 40 wavelengths 150a is separated by fiber-coupled demultiplexer 151a into six fibers 101a each propagating a band of six wavelengths, and four fibers 121a each propagating one wavelength. Free-space optical switch 141 separates wavelength bands 101a into individual wavelengths, and also switches wavelengths from wavebands 101a-101d and individual wavelengths from fibers 121a-121d in free space such that any input wavelength from any input fiber 150a-150d can be directed to any output fiber 199a-199d. Free-space optical switch 141 also recombines some of the output wavelengths into six bands of six wavelengths, and couples each band into an output fiber 161a. Each fiber-coupled multiplexer 152a combines six bands of six wavelengths 161a and four individual wavelengths 171a into a single output optical fiber 196a propagating 40 wavelengths. Optical power monitor 197a samples the fiber coupled optical power at optical fiber 196a, producing an optical output 199a, and an electrical output 198a containing a measure of the optical power at each of 40 wavelengths. Alternatively, other numbers of fibers and wavelengths may be used.

In addition, there are multiple wavelength independent input fibers 190 for add-ports, and multiple wavelength independent output fibers 195 for drop-ports, for example, fifty add-port input fibers 190 and fifty drop-port output fibers 195. Wavelength independent input add-ports 190 and drop-ports 195 are used to add and drop optical wavelengths, respectively, to equipment located near wavelength dependent optical switch 100.

In one embodiment, there may be an equal number of input optical fibers 150a-150d and output optical fibers 199a-199d that are coupled to optical switch 100. In one exemplary embodiment, there are seven input optical fibers 150a and seven output optical fibers 199a, each propagating up to 40 wavelengths or more. In one embodiment each fiber carriers four wavelengths spaced in wavelength by 400 GHz. In some applications, it is desirable to be able to repair wavelength selective optical switch 100 without interrupting live telecommunication traffic. In one embodiment, two wavelength-selective optical switches 100 are connected by input protection switches with at least one input and two outputs, and output protection switches with two inputs and at least one output.

Figure 2:
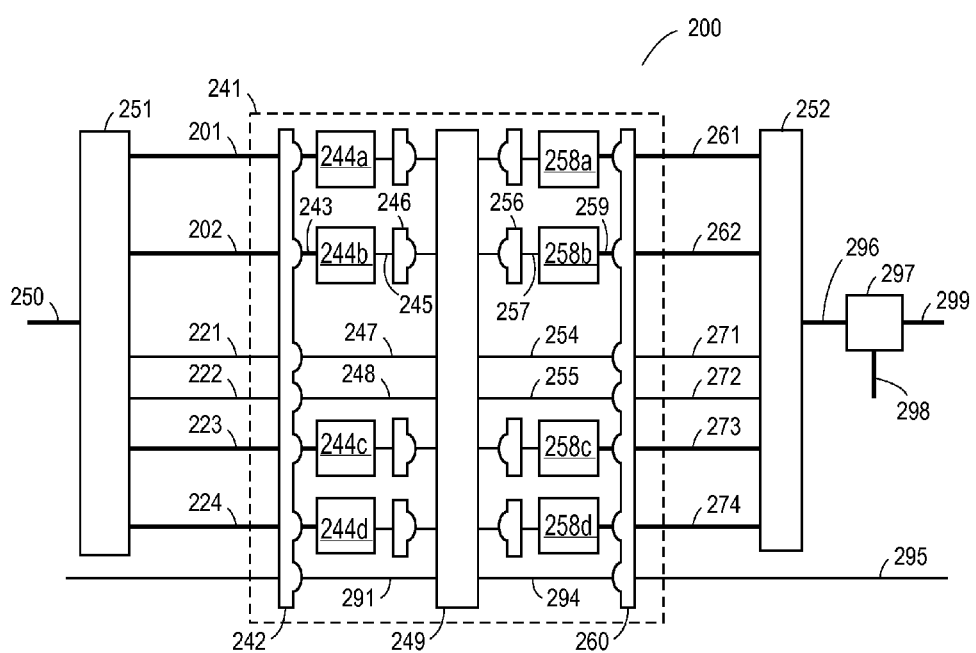
FIG. 2 illustrates one embodiment of a free-space optical switch.

More detailed operation of switch 100 of FIG. 1 is illustrated in FIG. 2, in which switch 200 includes a single input 250 and single fiber output 299. Optical input fiber 250 corresponding to one of inputs 150-150d of FIG. 1 is separated into six bands of six wavelengths each on fibers 201, 202, 223, and 224 and two fibers not shown, with the remaining four individual wavelengths on fibers 221 and 222 and two fibers not shown.

Optical fibers 201, 202, 221, 222, 223, and 224 are connected to free-space wavelength switch 241, where the optical signals propagate by the optical fibers are converted to free-space optical beams by lens array 242. Free-space optical beams refer to optical beams that travel without a confining structure such as an optical fiber or other optical waveguide. The single wavelength carried by optical fiber 221 is propagated as free-space beam 247 to free-space optical switch 249. A band of six wavelengths carried by fiber 202 is propagated as a free-space beam 243 to free-space demultiplexer 244b, where it is converted to six individual wavelength beams 245 (only one of the six wavelength beams 245 is shown for clarity). Additional add-port fiber inputs 290 of arbitrary wavelength corresponding to add-port inputs 190 of FIG. 1 are converted by lens array 242 to free-space optical beams 291, without passing through fiber wavelength demultiplexers 251 or free-space wavelength demultiplexers 244a-d.

The free-space optical path lengths of free-space beams 245 passing through demultiplexers 244a-d are longer than the free-space optical path of individual wavelengths such as 247, resulting in more beam spreading due to optical diffraction for beams from fibers 201, 202, 223, or 224 containing wavelength demultiplexers 244a-d in the optical path. Consequently optical beams 245 that are demultiplexed in free-space may be operated on by additional lenses 246 to counteract the beam spreading due to diffraction.

It will be understood that in some optical designs, lens arrays 242 and 260 may be individual lenses, or several lens arrays may be used. In one embodiment, diffraction compensation lenses 246 will not be used, or diffraction compensation lenses 246 will be used only for the wavelengths with the largest optical path lengths and thus the largest diffraction. In one embodiment, free-space beams 247 of individual wavelengths will also have lenses 246 to counteract diffraction, although these lenses are not shown in FIG. 2. In one embodiment, multiple lenses 246 may be used to change the free-space optical beam size from free-space demultiplexers 244a-d to a smaller or larger free-space beam size for free-space optical switch 249. In general, multiple lenses 246 may be formed of individual lenses, or lens arrays may be used for many beams within wavelength switch 241. The focal length of lenses 246 may be equal for every wavelength, or may vary depending on free-space optical path length within switch 241. Suitable lens arrays fabricated from silicon wafers are commercially available from manufacturers such as Advanced Microoptic Systems of Germany.

Free-space optical switch 249 switches free-space optical input beams including 245, 247, 248, and 291 to free-space optical output beams including 254, 255, 257, and 294. Optical output 254 is coupled into optical fiber 271 propagating a single optical wavelength using output lens array 260. Six optical output optical beams 257 are combined to form a free-space optical beam 259 propagating six wavelengths that is coupled into optical fiber 262. Similarly, optical fiber 261 carries six wavelengths, optical fiber 273 carries six wavelengths, and optical fiber 274 carries six wavelengths. Optical bands from fibers 261, 262, 273, and 274, and two bands (not shown), and individual wavelengths from fibers 271, and 272, and two wavelengths (not shown), are combined by optical multiplexer 252 to produce a single output fiber 296 propagating 40 wavelengths. The majority of the optical power of fiber 296 is sent to output fiber 299. Optical channel monitor 297 samples the optical power in fiber 296, producing 40 electrical outputs 298, each output 298 being proportional to the optical power at the corresponding wavelength in fiber 296.

Figure 3:
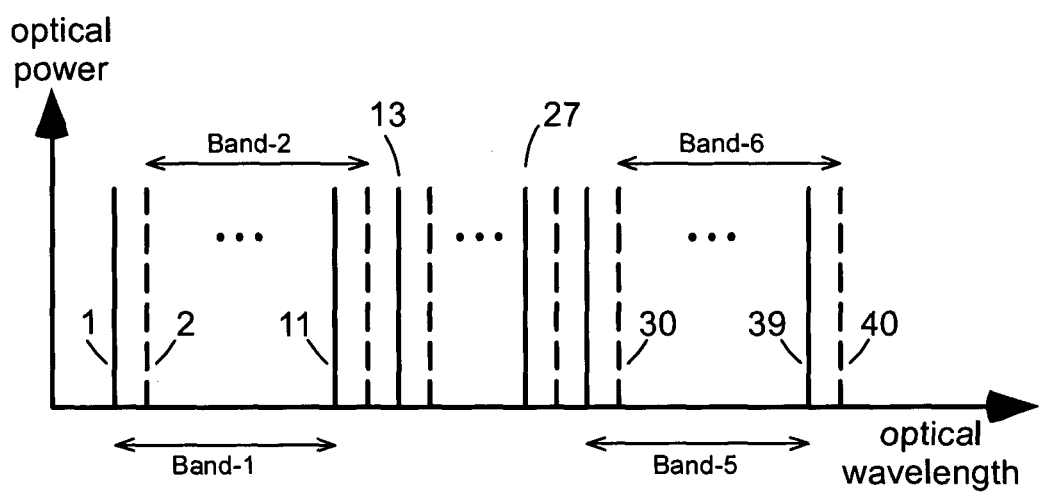
FIG. 3 illustrates one embodiment of optical wavelength banding.

FIG. 3 illustrates an exemplary embodiment of optical wavelength banding. In particular, FIG. 3 illustrates how the 40 input wavelengths of fiber 250 of FIG. 2 are broken into bands and individual wavelengths by demultiplexers 251. In this exemplary embodiment, Band-1 includes the first six odd numbered wavelengths. Band-2 includes the first six even-numbered wavelengths. Two individual wavelengths 13 and 14 are next, followed by six odd-numbered wavelengths of Band-3 and six even-numbered wavelengths of Band-4. Two individual wavelengths 27 and 28 are next, followed by six odd-numbered wavelengths of Band-5 and six even-numbered wavelengths of Band-6. Alternatively, other optical wavelength banding configurations may be used.

Figure 4:
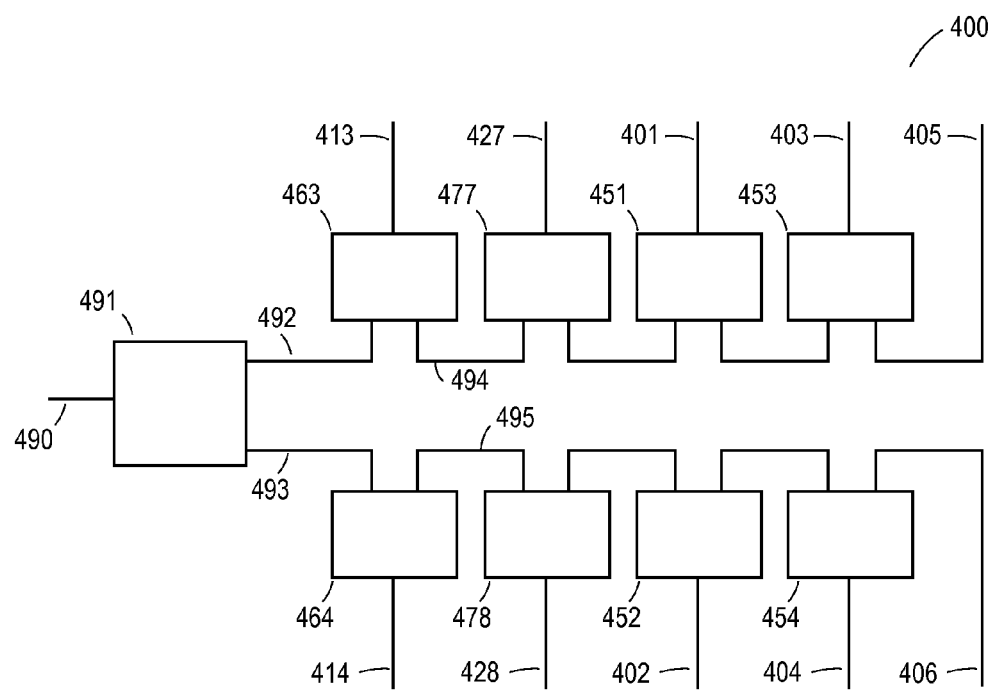
FIG. 4 illustrates one embodiment of a fiber-optic band demultiplexer.

FIG. 4 illustrates one embodiment of a fiber-optic band demultiplexer. Fiber demultiplexer 400 corresponds to fiber demultiplexers 251 of FIG. 2. In this embodiment, input optical fiber 490 carries 40 optical wavelengths, and fiber coupled interleaver 491 separates the odd-numbered wavelengths from input fiber 490 to output fiber 492 and the even-number wavelengths from input fiber 490 to output fiber 493. The interleaver 491 thus, in this embodiment, separates the 40 input wavelengths spaced 100 GHz apart into two sets of input wavelengths spaced 200 GHz apart. Alternatively, other interleaving configurations may be used. Interleavers are commercially available from manufacturers such as JDS Uniphase of Ontario, Canada.

Wavelength 13 is extracted from the wave-division-multiplexed (WDM) input signal by filter 463 and sent to optical switch 241 as an individual wavelength by fiber 413. Then wavelength 27 is extracted by filter 477 and sent to optical switch 241 by fiber 427. Band-1 is separated by filter 451 and sent to optical switch 241 by fiber 401, and Band-3 is extracted by filter 453 and sent to optical switch 241 by fiber 403. The remaining Band-5 wavelengths are sent to switch 241 by fiber 405. Similarly, the even-numbered wavelengths are extracted into individual wavelengths by filters 464 and 478, and into bands by filters 452 and 454. In the exemplary embodiment, demultiplexers 451-454, 463, 464, 477, and 478 are fiber coupled, with a free-space interference filter within each device. The design and fabrication of interference filters for demultiplexers and multiplexers is well known to those skilled in the art. Interference filters are commercially available from manufacturers such as AOC of Pleasanton, Calif. and JDS Uniphase of Ontario, Canada. It will be understood that embodiments of the present invention can be applied to a wide variety of optical wavelength bands. In another embodiment, individual wavelengths 13, 14, 26, and 27 of FIG. 3 are not be used between bands. In another embodiment, two stages of interleavers may be used to increase the wavelength spacing, for example, from 100 GHz to 400 GHz before separating bands of wavelengths within free-space optical demultiplexers 244a-d of FIG. 2.

Optical multiplexer 252 of FIG. 2 is similar to optical demultiplexer 400 of FIG. 4, except that the optical bands and wavelengths are combined in reverse order to the order in which they are separated in order to minimize the maximum optical loss. Optical Band-1, Band-3, and Band-5 are combined in fiber-coupled band multiplexers and then wavelengths 13 and 27 are added. Similarly, optical Band-2, Band-4, and Band-6 are combined in fiber-coupled band multiplexers and then wavelengths 14 and 28 are added. Finally, the odd wavelengths from Band-1, Band-3, and Band-5 are combined in an output interleaver similar to input interleaver 360 with the even wavelengths from Band-2, Band-4, and Band-6.

Figure 5:
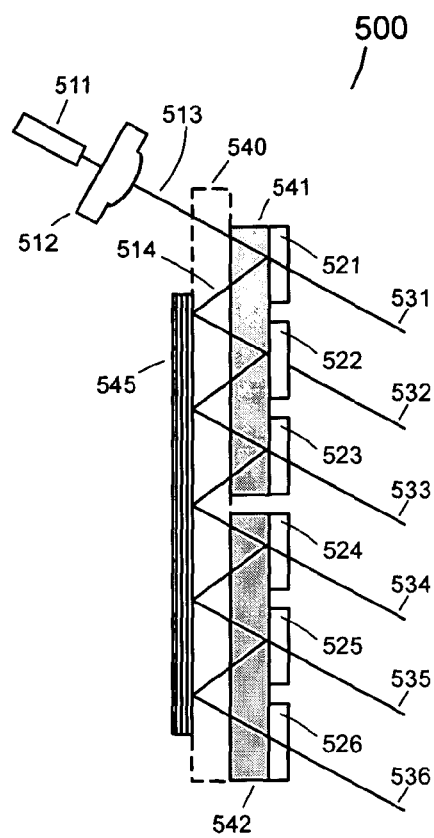
FIG. 5 illustrates one embodiment of a free-space demultiplexer having multiple optical filters on each filter substrate.

FIG. 5 illustrates one embodiment of a free-space demultiplexer having multiple optical filters on each filter substrate. In this embodiment, the construction of free-space demultiplexers 244a-d of FIG. 2 is shown in FIG. 5. Demultiplexer 500 has input fiber 551 and other fibers in a direction perpendicular to the illustration that are not shown, the other fibers corresponding to the same wavelength from a different input fiber 150b-150d of FIG. 1. Light from input fiber 551 is collimated by lens array 512 to produce input beam 513 propagating a band of six optical wavelengths. In one embodiment, filters 521-523 may be formed on a common substrate 541 by, for example, patterned deposition of the filter dielectric layers. This may insure that all three filters are parallel with respect to each other. A broadband reflector 545 may be patterned on transparent substrate 540, allowing beam 513 to pass through transparent substrate 540 with minimal attenuation. One wavelength of beam 513 is transmitted by filter 521 to beam 531 and the remaining wavelengths are reflected to broadband reflector 545. Similarly, the second wavelength is transmitted by filter 522 to beam 532, and the third wavelength is transmitted by filter 523 to beam 533. A second set of three filters 524-526 on second substrate 542 transmits individual wavelengths 534-536. In this exemplary embodiment, the optical filters are secured to an optically transparent substrate 540 as shown. In another embodiment, the optical filters may be secured to a non-transparent substrate that has material removed in order to form cavities that allow optical beam propagation.

The input beam 513 contains six wavelengths from one band, for example Band-1 of FIG. 3 containing the first six odd-numbered wavelengths. In the exemplary embodiment, alternating wavelengths, for example wavelengths 1, 5, and 9 are sequentially removed first with optical filters 521-523. The remaining three wavelengths 3, 7, and 11 are more widely separated in wavelength than the original six input wavelengths in beam 513. The bandwidth of the remaining optical filters 534-536 can be somewhat broader than filters 521-523, resulting in lower insertion loss and lower polarization dependent loss than if each wavelength were removed in ascending order.

Free-space optical multiplexers 258a-d of FIG. 2 are similar to demultiplexer 500 of FIG. 5, except that the optical beams travel in the opposite direction for multiplexing as for demultiplexing. In this embodiment, the wavelengths are recombined at the output in the same order as the wavelengths are separated at the input. Some wavelengths are reflected more times than average at the input demultiplexers 244a-d, while some wavelengths are reflected more times than average at the output multiplexers 258a-d. This means that each wavelength experiences the same number of filter reflections when passing through the switch, minimizing the maximum insertion loss for all wavelengths. In another embodiment, the order of separating and combining the wavelengths is varied to generate an intentional wavelength dependent loss distribution, in order to compensate for a system wavelength dependent loss distribution such as the optical amplifier chain. The exemplary embodiment separates each optical wavelength to a single optical wavelength per optical beam. The extension of this configuration to switching optical beams each propagating multiple wavelengths will be apparent to one skilled in the art.

The free-space optical switch 249 of FIG. 2 does not need to be able to switch any input port to any output port, as any input wavelength such as wavelength 1 of FIG. 3 need only be switched to another wavelength 1 port or switched to any drop-port 195. However, every add-port 190 of FIG. 1 may be required to be able to switch to any output wavelength, and any input wavelength may be required to switch to any drop-port 195. With proper design, the add-port and drop-port connectivity determines the switching requirements of optical switch 249, which in turn define the required mirror angles to implement the switch.

Figure 6:
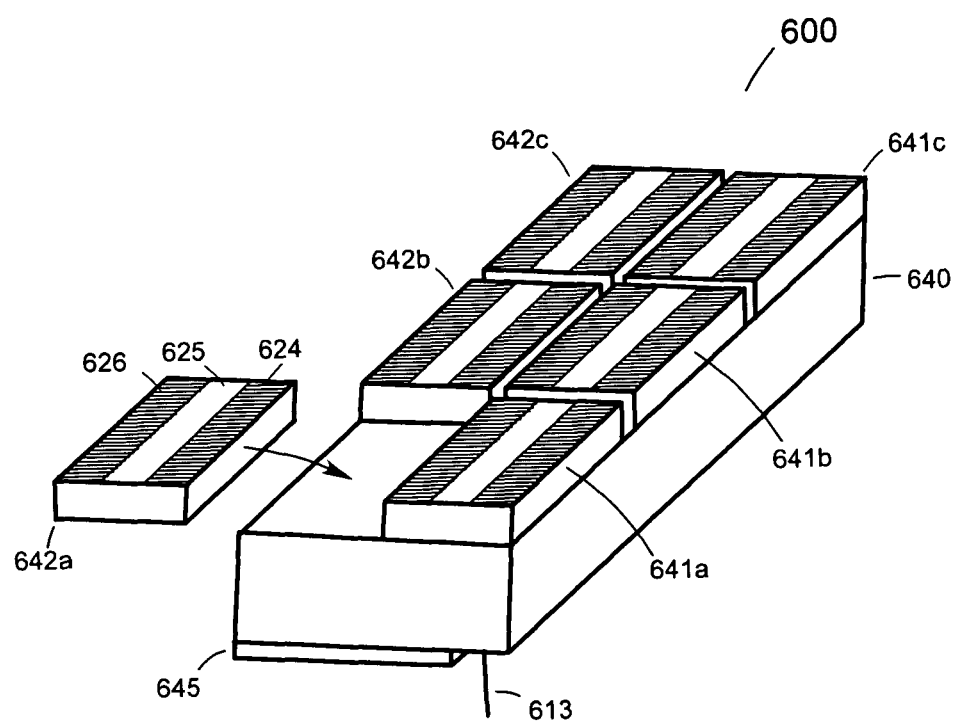
FIG. 6 illustrates an exemplary embodiment of a filter assembly having six filter substrates.

FIG. 6 illustrates an exemplary embodiment of a filter assembly having six filter substrates. In this embodiment, the assembly of three demultiplexers 500 is disposed on a single transparent substrate. Filter substrates 641*a*-641*c* and 642*a*-642*c* are mounted on a common transparent substrate 640, corresponding to transparent substrate 540 of FIG. 5. Six filter substrates 641*a*-641*c* and 642*a*-642*c* demultiplex three bands, for example Band-1, Band-2, and Band-3 wavelengths in free-space. Demultiplexer 641*a* and 642*a* correspond to filter 541 and 542 for Band-1. Demultiplexer 641*b* and 642*b* correspond to filter 541 and 542 for Band-2. Demultiplexer 641*c* and 642*c* correspond to filter 541 and 542 for Band-3. Each filter substrate 642*a* has three patterned filters 624-626, corresponding to filters 521-523 or 524-526 of FIG. 5, that demultiplexes three optical beams.

Each filter substrate 641*a*-641*c* has six input beams 613 each corresponding to an input beam 513, and each beam propagating six wavelengths from one optical band. Four of the input beams correspond to the four fibers 101*a*-101*d* of FIG. 1, with two additional input beams allocated for yield. Filter assembly 600 has six inputs for Band-1, six inputs for Band-2, and six inputs for Band-3, for a total of 18 input beams each propagating six wavelengths. Reflector 645, corresponding to reflector 545 of FIG. 5, covers most of the back of transparent substrate 640, but does not block input beams 613.

Figure 7A:
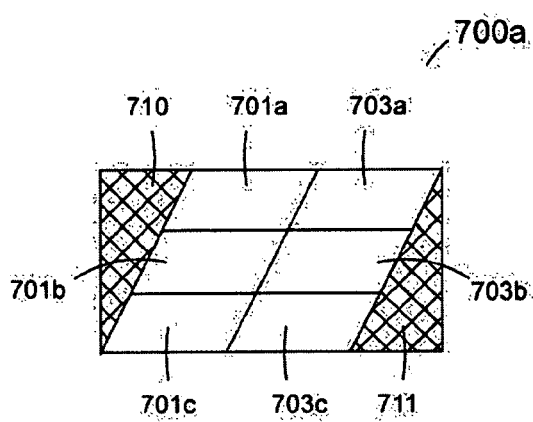
FIG. 7a illustrates one embodiment of the allocation of bands and wavelength independent inputs within a mirror array.
Figure 7B:
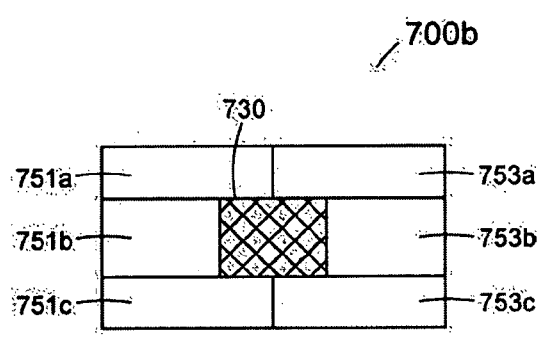
FIG. 7b illustrates an alternative embodiment of the allocation of bands and wavelength independent inputs within a mirror array.

The relative position of the demultiplexer filters for Band-1 to Band-6 of FIG. 3 is shown in FIG. 7*a*. Each wavelength and band of wavelengths is grouped in one region of the array to reduce the maximum required mirror rotation in switch 249. Regions 701*a*-701*c* demultiplex Band-1 through Band-3, and correspond to filter substrates 641*a*-641*c* and 642*a*-642*c* of filter assembly 600*b*. Regions 703*a*-703*c* demultiplex Band-4, Band-5, and Band-6, and also correspond to a similar filter assembly 600*b* but with different filter passbands. Add-ports corresponding to 291 of FIG. 2 and individual wavelengths corresponding to 247 of FIG. 2 are located in regions 710 and 711, at the sides of the free-space demultiplexers. In an alternate embodiment shown in FIG. 7*b*, add-ports 291 and individual wavelengths 247 are located at region 730 at the center of the free-space input beams, and demultiplexing regions 751*a*-751*a* and 753*a*-753*c* are located at the perimeter.

Figure 8:
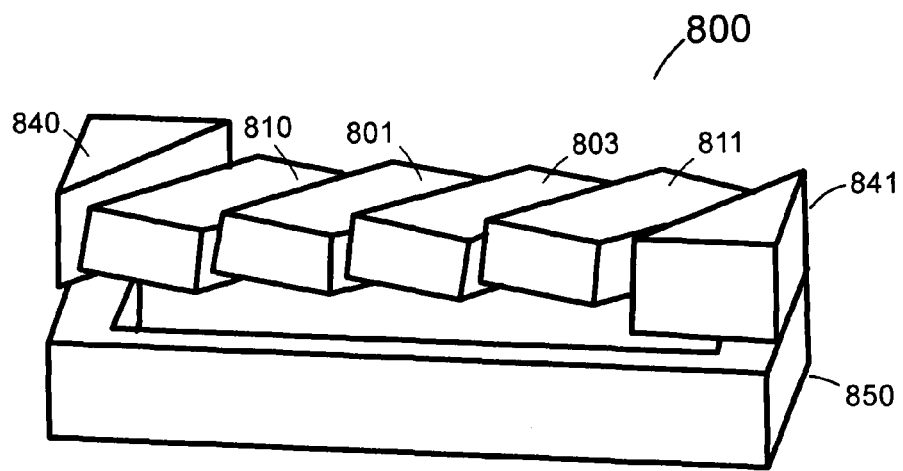
FIG. 8 illustrates one embodiment of filter assemblies and spacers.

Two filter assemblies 801 and 803 are shown in FIG. 8, each assembly corresponding to filter assembly 600 of FIG. 6. Filter assembly 801 corresponds to region 701*a*-701*c* of FIG. 7, and demultiplexes Band-1, Band-2, and Band-3. Filter assembly 803 corresponds to region 703*a*-703*c* of FIG. 7 and demultiplexes Band-4, Band-5, and Band-6. Filter assemblies 801 and 803 cause a beam shift due to Fresnel refraction at the angled substrate. Optical elements 810 and 811 pass the wavelength independent add-ports 247 and single-wavelength inputs 291 of FIG. 2, corresponding to regions 710 and 711*a* of FIG. 7*a*. Optical elements 810 and 811 are also angled substrates like filter assemblies 801 and 803, in order to induce a beam shift similar to the beam shift induced by filter assemblies 801 and 803. Lens spacers 840 and 841 hold diffraction-compensation lens array 246 of FIG. 2. Collimator mount 850 holds filter assemblies 801 and 803, optical elements 810 and 811, and lens spacers 840 and 841 relative to input lens array 242 of FIG. 2. In one embodiment, output multiplexers 258*a*-*d* of FIG. 2 are constructed using a collimator assembly similar to demultiplexer assembly 800.

The alignment of filter substrates 541 and 542 relative to reflector 545 may be important for proper filter performance. A passive alignment technique may be used to achieve the required filter angle accuracy, using the interference filter substrate 541 as a reference surface for passive alignment before substrate dicing rather than after substrate dicing. The technique of passively aligning filters from different filter substrates is illustrated in FIGS. 9*a* and 9*b*.

Figure 9A:
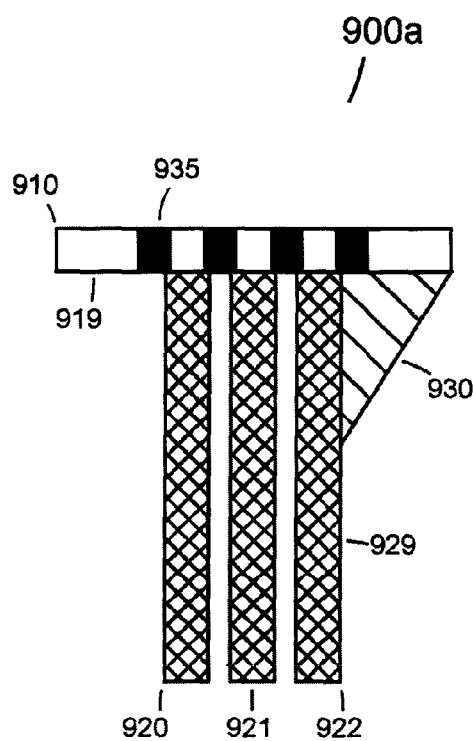
FIG. 9a illustrates one embodiment of a perpendicular mounting of filters.
Figure 9B:
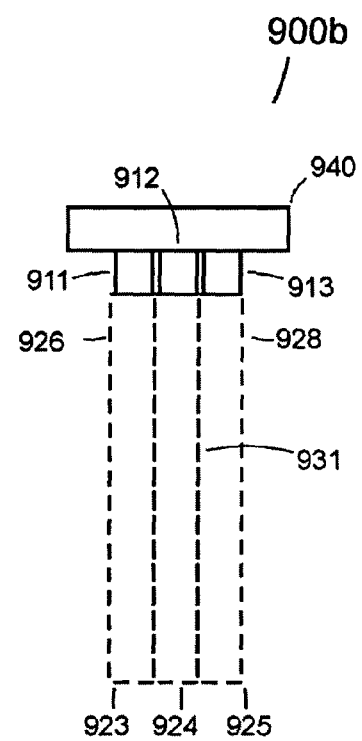
FIG. 9b illustrates one embodiment of a matched set of filters that are bonded together.

FIG. 9*a* illustrates one embodiment of perpendicular mounting of filters. In this embodiment, filter substrate 910 is shown before dicing 900*a*, bonded to three alignment structures 920-922. The bottom surface 919 of substrate 910 is constrained by passive alignment during bonding to a desired angle to sides 929 of alignment structure 922 using a passive alignment feature 930. Alignment structures 920 and 921 similarly are constrained to a desired angle to substrate surface 919 during bonding. Filter substrate 910 is diced into individual filters by removing sections 935 with a dicing saw, leaving separate alignment structures 920-922 each with a piece of filter substrate 910 bonded to it. Different filter substrates 911-913 from different filter wafers with alignment structures 923-925 bonded to them are characterized and matched together to form a matched set of filters 900*b*, which are bonded together as shown in FIG. 9*b*. Surfaces 931 are used to provide passive alignment to constrain each of alignment structures 923-925 to a desired angle relative to each other during the bonding process. Next, filter substrates 911-913 are bonded to a substrate 940 corresponding to 540 of FIG. 5, and alignment structures 923-925 are removed. The process illustrated in FIG. 9 produces filters 911-913 that are passively aligned at a much more precise angle than could be obtained by dicing and bonding them directly to substrate 940, as reference surface 929 is much larger than the reference surfaces of filters 911-913, and small positional errors introduce much smaller angular errors in a large reference surface 929 than small filter reference surfaces 911-913. In an alternate embodiment the interference filters are actively aligned using a multi-wavelength or wavelength tunable optical beam, by adjusting the angles of the interference filters 531-536 of FIG. 5 to achieve the required parallelism from the output optical beams 531-536 of FIG. 5.

Figures 10A, 10B:
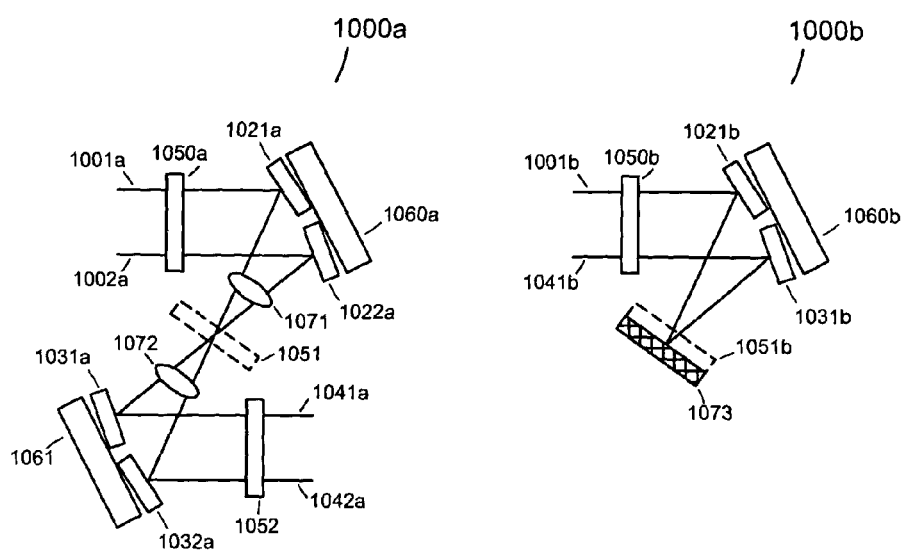
FIG. 10a illustrates one embodiment of a MEMS switch with polarization rotation in a unidirectional switch configuration.
FIG. 10b illustrates an alternative embodiment of a MEMS switch with a reflective switch configuration.

FIG. 10*a* illustrates one embodiment of a MEMS switch in a unidirectional switch configuration. Optical switch 1000*a* corresponds to switch 249 of FIG. 2. Switch 1000*a* includes input beams 1001*a* and 1002*a*, an input quarter-wave plate 1050*a*, an input mirror array 1060*a*, input mirrors 1021*a* and 1022*a* that rotate in two axes, an output mirror array 1061, output mirrors 1031*a* and 1032*a* that rotate in two axes, and an output quarter-wave plate 1052. A half-wave plate 1051 for polarization rotation may be used between input mirror array 1017 and output mirror array 1027 in place of input quarter wave plate 1050a and output quarter wave plate 1052.

FIG. 10b illustrates an alternative embodiment of a MEMS switch with a reflective switch configuration. Reflective switch 1000b receives input beams 1001b and other beams not shown. Reflective switch 1000b includes a quarter-wave plate 1050b to reduce polarization dependent loss and polarization shift of the filter center wavelength, array 1060b of mirrors that rotate in two axes, input mirrors 1021b, output mirrors 1031b, and a broadband mirror 1073 that couples input optical beams 1001b to output optical beams 1041b. A quarter-wave plate 1051b for polarization rotation may be used near reflector 1073 rather than at input 1050b.

In one embodiment, the method of fabricating two-dimensional arrays of mirrors 1060a, 1061, and 1060b uses MEMS mirrors etched from bulk silicon to form vertical comb drives. In one embodiment, actuators may be used to induce mirror rotation, for example, as described in International Publication No. WO 01/57902 A2, published Aug. 9, 2001, entitled "Electrostatic Actuator for Microelectromechanical Systems and Method of Fabrication." Two-dimensional arrays of MEMS mirrors that rotate in two axes are available from a variety of manufacturers, including Glimmerglass of Hayward, Calif. and IMMI of Pasadena, Calif.

Large free-space optical beams are desirable to minimize optical diffraction, and large optical beams decrease optical loss between the multiplexers, optical switch, and demultiplexers. However, large optical beams require large optical separation between the optical filters, resulting in increased optical path length and higher mechanical and temperature sensitivity. In one embodiment, lenses may be used to counteract diffraction within the optical demultiplexers, and between the free-space demultiplexers, optical switch, and free-space multiplexers. These diffraction-compensation lenses allow smaller free-space optical beams to be used, resulting in a more compact and stable optical package.

Figure 11:
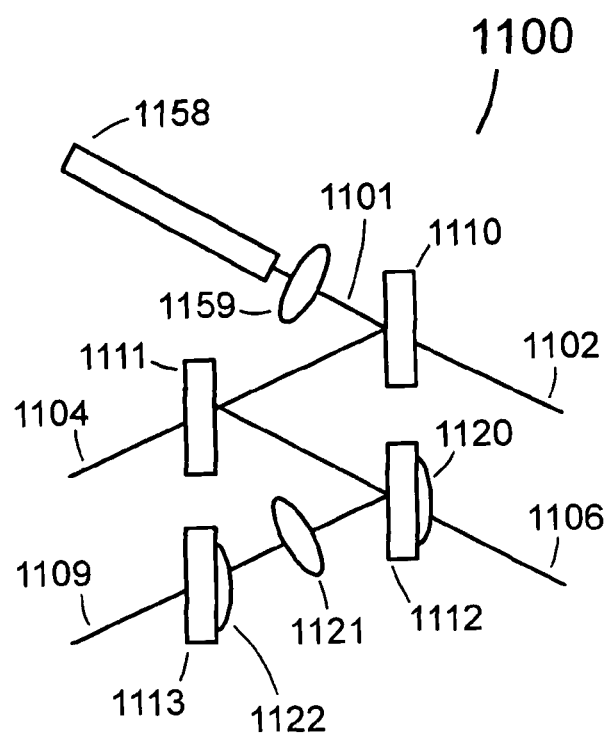
FIG. 11 illustrates one embodiment of lensing within a free-space demultiplexer to minimize optical diffraction.

FIG. 11 shows diffraction-compensating lenses within demultiplexer 1100, corresponding to free-space demultiplexers 244a-d. Input fiber 1158 propagating multiple optical wavelengths forms a free-space collimated beam 1101 using collimating lens 1159. Filters 1110-1113 separate individual wavelengths into free-space optical beams 1102, 1104, 1106, and 1109. In this exemplary embodiment, a diffraction compensation lens 1122 is mounted to the interior surface of filter 1113, as well as the interior of other filters not shown. In another embodiment, diffraction-compensation lens 1120 corresponding to lens 146 of FIG. 1 is mounted to the exterior surface of filter 1112, to correct for diffraction of free-space output beam 1106. Lenses 1120 and 1122 are positioned at an angle to the optical beams, producing undesirable optical aberration that increases optical loss. In one embodiment, the surface of lens 1120 or 1122 is corrected to compensate for aberration induced by the off-axis illumination of the lens by the optical beam 1106 or 1109 respectively. In one embodiment, the lens cross-section 1123 is elliptical. Alternatively, other cross section shapes may be used. In another embodiment, lens 1121 is placed in the cavity between filter 1112 and filter 1113, aligned to the beam to minimize aberration.

In one embodiment, diffraction-compensation lens 1120 or 1122 is fabricated by heating photoresist to reflow it to a curved shape, followed by substrate etching to transfer the curved lens shape to the substrate. In another embodiment, lenses 1120 and 1122 may be fabricated by patterned etching, then mass transport at high temperature to smooth the lens shape.

In one embodiment, diffraction-compensation lens 1120 or 1122 is fabricated by patterned etching of one to three dielectric layers deposited on filter 1112 or filter 1113. By using multiple lenses at multiple filter substrates 1112 and 1113, interior lenses 1122 can have less curvature than exterior lenses 1120, and thus interior lenses 1122 can better be approximated by the stepped dielectric levels than lenses with more curvature.

Conventional wavelength-selective optical switches have required very high mirror yield within the array, and any mirror yield fallout produced wavelength blocking within the switch. Embodiments of the present invention include two methods for reducing the impact of mirror yield on switch capability. One technique that reduces the impact of mirror yield is dividing the wavelengths into subbands external to the free-space filter as shown in FIG. 2, resulting in demultiplexers 251 having fewer output wavelengths and thus less sensitivity to mirror yield. In the exemplary embodiment, demultiplexers 251 need six working mirrors to form a working set of mirrors, with resulting higher yield than using 40 working mirrors in a set as required if a subband approach was not used. Using fiber demultiplexers 251 of FIG. 2, the smaller number of wavelengths per free-space demultiplexer reduces the probability that any particular set of wavelengths will have a defective port. Demultiplexer 500 with redundant fiber input 511 is fabricated. If all of the mirrors corresponding to outputs 531-536 are not functional, a different fiber 511 from a fully functional demultiplexer is spliced to fiber demultiplexer output 201.

Figure 12A:
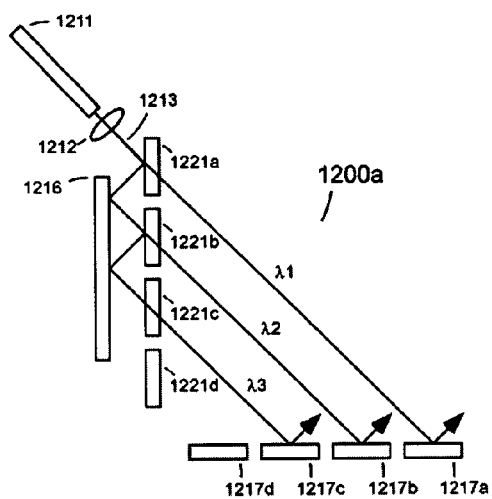
FIG. 12a illustrates one embodiment of a demultiplexer and mirror array with redundant wavelength capacity.

Another method embodiment of reducing the impact of mirror yield on wavelength switch capability is illustrated in FIG. 12a with demultiplexer 1200, corresponding to demultiplexer 500 of FIG. 5. The redundant hardware configuration 1200a of FIG. 12a has a fully functional mirror array including mirrors 1217a-1217d. In this exemplary embodiment, input fiber 1211 contains three wavelengths, and produces a collimated free-space beam 1213 using collimating lens 1212. Filter 1221a passes the first wavelength and reflects all other wavelengths to mirror 1216, which is reflective at all wavelengths. Filter 1221b passes the second wavelength and reflects the third wavelength. Filter 1221c passes the third wavelength, although the final filter 1221c might be omitted.

Figure 12B:
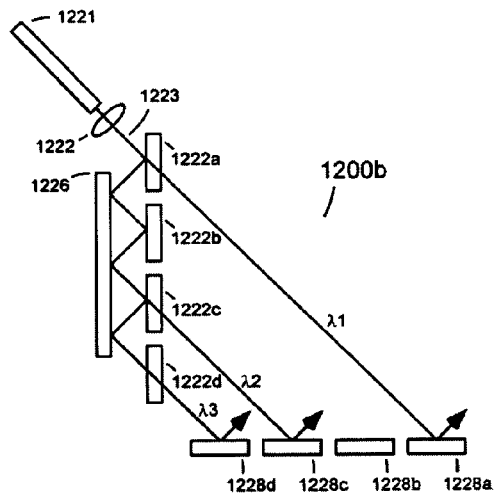
FIG. 12b illustrates one embodiment of a demultiplexer matched to working mirrors.

FIG. 12b illustrates the same hardware configuration 1200b in the case where mirror 1228b is not fully functional. Here, filter 1221b of FIG. 12a is replaced by mirror 1222b that is reflective at all wavelengths, and filter 1222c passes the second wavelength. Filter 1222d passes the third wavelength, although filter 1222d might be omitted in some embodiments. Due to mirror yield dropout of mirror 1228b in configuration 1200b, mirrors 1228a, 1228c, and 1228d take over the switching functions of mirrors 1217a-1217c of configuration 1200a, and the switch remains fully functional at all wavelengths. In an alternative embodiment, mirror 1226 may be formed of separate reflective elements, rather than having a single continuous reflective surface, with each of the reflective elements reflecting a different one of the wavelengths from filters 1222a-1222c.

Figure 13:
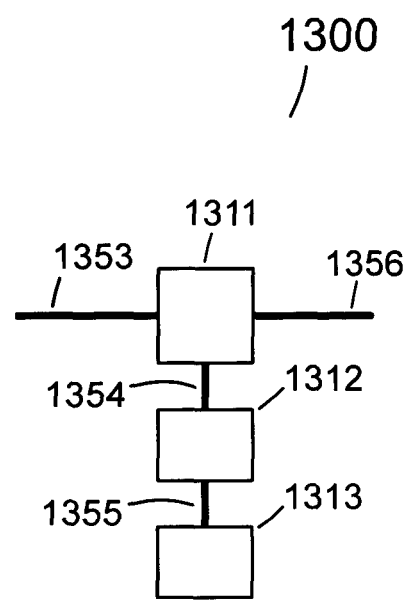
FIG. 13 illustrates one embodiment of wavelength optical power monitoring at an optical output.

Optical power monitoring may be provided at ports 298 of FIG. 2 for fault detection and isolation, for mirror optimization, and for optical loss characterization. Output channel monitor 1300 of FIG. 13, corresponding to output wavelength selective detector 297 of FIG. 2, measures the optical power at each optical wavelength, to allow monitoring of the correct alignment of mirror arrays 1017 and 1027 of FIG. 10a, which are part of switch 249 of FIG. 2. Fiber splitter 1311 is a broadband tap that samples 1% of the output power on fiber 1353 to fiber 1354 for monitoring, with the remaining 99% of the output power going to fiber 1356 that is routed to the rest of the optical network. Demultiplexer 1312 separates the 40 wavelengths on fiber 1354 for power measurement, and detector 1313 measures the optical power at each individual wavelength. In the exemplary embodiment demultiplexer 1312 separates the optical wavelengths in free-space, resulting in multiple free-space beams 1355 that carry the separated optical wavelengths to detector array 1313, which measures the optical power at each wavelength simultaneously. In another embodiment demultiplexer 1312 separates the optical wavelengths into multiple fibers 1355, which carry the separated optical wavelengths to detector array 1313. In another embodiment, demultiplexer 1312 is a tunable filter that separates each wavelength into time slots for measurement, in which case 1355 is an optical fiber that carries a single wavelength at a time to a single detector 1313. In another embodiment, the amplitude of each wavelength is provided a different modulation pattern, and the optical power at each wavelength is determined by detecting the corresponding modulation power. Wavelength channel monitors are commercially available from manufacturers such as Optovation of Ontario, Canada and Santec of Aichi, Japan.

FIG. 14*a* illustrates one embodiment of wavelength optical channel monitoring at an optical input with a partially absorbing photodetector array. Optical power at each wavelength is measured in free-space inside the optical switch using optical power monitor 1400*a* as shown in FIG. 14*a*. Transmissive photodetector array 1408 measures optical power of each input beam 243 of FIG. 2. Input fiber 1401 produces collimated optical beam 1403, which is split into optical beams 1406*a*-1406*d* each containing one wavelength, using wavelength filters 1404*a*-1404*d* and broadband mirror 1407. Photodetector array 1409 has a thin optical absorption region to absorb only a small fraction of the input beam, and a transparent substrate to minimize other optical loss. An electrical output 1409 gives the measure of the optical power of each optical beam, with an electrical signal at output 1409 that is proportional to the optical power in the input beams 1406*a*-1406*d*.

FIG. 14*b* illustrates an alternative embodiment of wavelength optical channel monitoring with a wavelength selective optical tap. In this embodiment, detector array 1459 of monitor 1400*b* is on the opposite side of the demultiplexer as the output optical beams 1456*a*-1456*c*. Here, input collimated beam 1453 containing the first 6 odd wavelengths 1-11 of FIG. 3 is reflected from a broadband reflector 1457, and is incident on a partially transmissive filter 1455*a* that passes 1% of wavelength 1 of FIG. 3 and reflects all other wavelengths. Filter 1454*a* passes the remaining 99% of wavelength 1 and reflects all other wavelengths. Similarly, filters 1455*b* and 1455*c* pass 1% of wavelength 3 and wavelength 5 of FIG. 3 respectively, and filter 1456*b* and 1456*c* pass the remaining 99% of wavelength 3 and wavelength 5 respectively. As a result, detector array 1458 samples 1% of each input optical wavelength, and optical beams 1456*a*-1456*c* carry the remaining 99% of each input optical wavelength to optical switch 249 of FIG. 2. Detector array 1458 produces electrical outputs 1459 from the sampled wavelengths, with an electrical output proportional to the optical power in each optical beam. In another embodiment, additional input channel monitors similar to output monitor 1300 of FIG. 13 would monitor the input power of each input fiber 150*a*-150*d* of FIG. 1.

Figure 15:
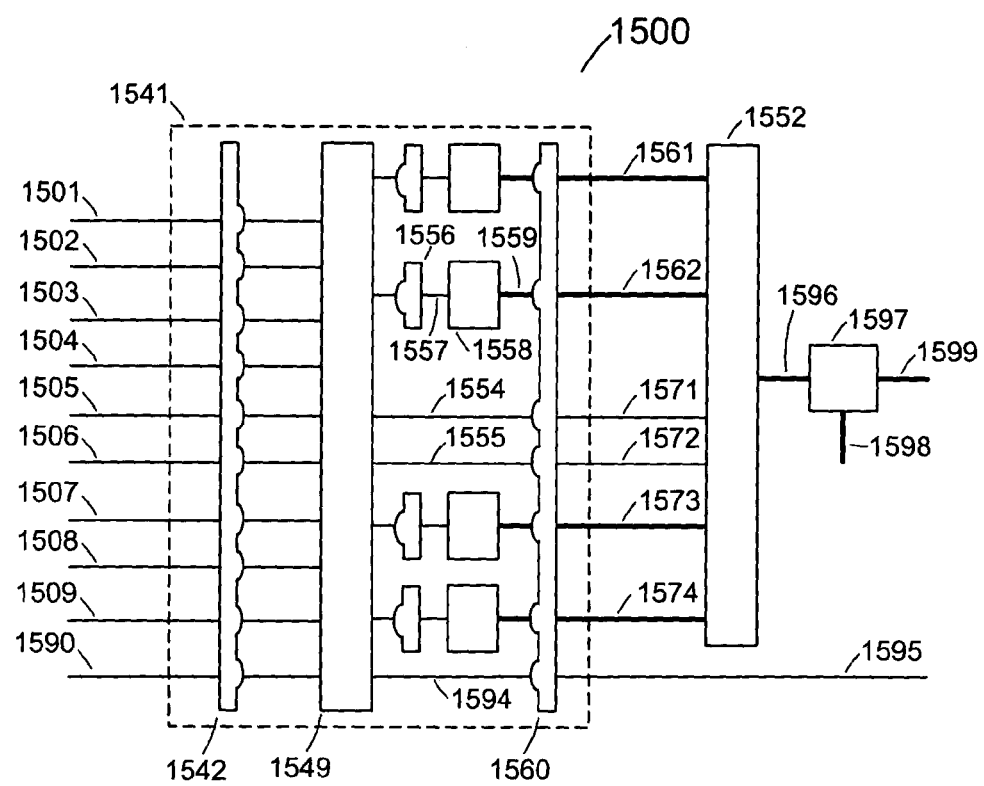
FIG. 15 illustrates an alternative embodiment of an optical wavelength switch with output multiplexers and without input demultiplexers.

The wavelength dependent optical switch 100 of FIG. 1 has an approximately equal number of inputs and outputs propagating multiple wavelengths, and an approximately equal number of wavelength independent add-ports and drop-ports. In an alternate embodiment, wavelength selective optical switch 1500 shown in FIG. 15 has each input 1501-1509 propagating a single optical wavelength, and outputs 1561 and others propagating multiple wavelengths. In one embodiment, 256 input optical ports 1501 each propagating a single optical wavelength can be switched to any of 64 optical output ports, where each output optical fiber can carry four optical wavelengths. In one embodiment outputs 1561 and others, each propagating four wavelengths, are combined together using fiber coupled multiplexer 1552. Another embodiment is the mirror image of wavelength optical switch 1500 shown in FIG. 15, where the wavelength selective optical switch has inputs propagating multiple wavelengths and outputs each propagating a single wavelength.

Figure 16:
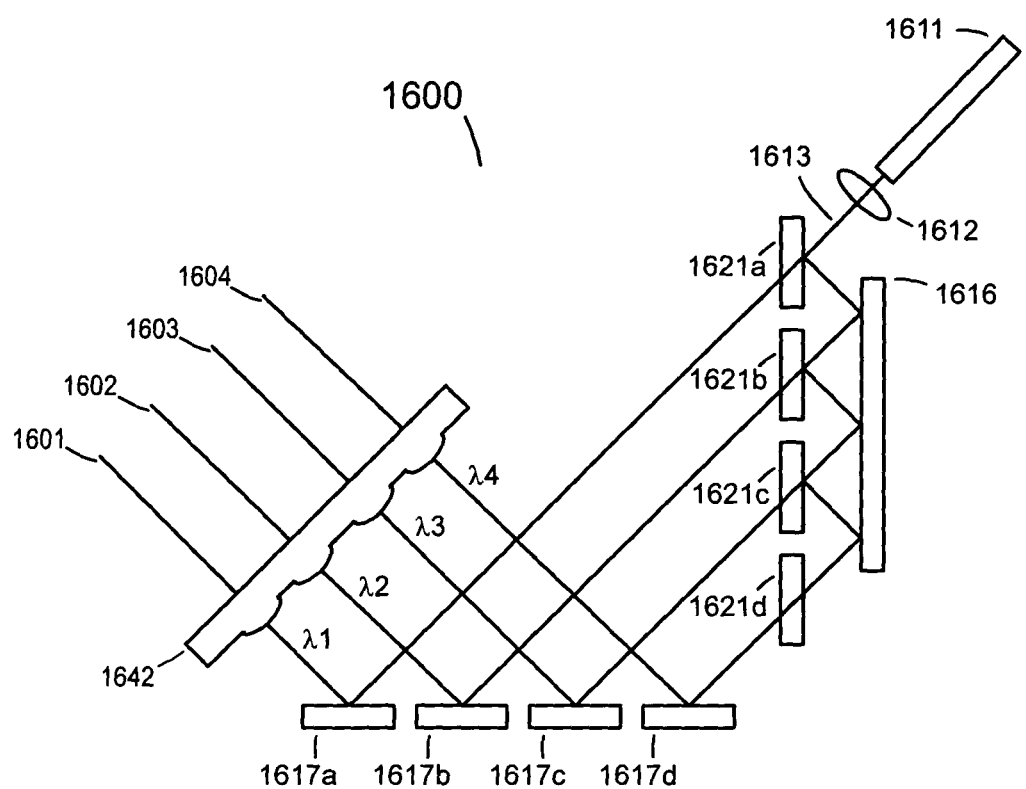
FIG. 16 illustrates an alternative embodiment of an optical wavelength switch with an input mirror array but no output mirror array.

In one embodiment the input and output fibers 150*a*-150*d* and 199*a*-199*d* propagate only a single spatial optical mode, for example, using a SMF-28 single-mode optical fiber available from Corning of Corning, N.Y. In another embodiment 1600 shown in FIG. 16, switch input fibers 1601-1604 are single-mode optical fiber and the switch output fibers 1611 are multimode optical fibers, where only one output fiber 1611 is shown. Here, the output fibers 1611 can propagate multiple spatial modes with a larger acceptance angle than single-mode optical fiber, and so only a single array of mirrors 1617*a*-1617*d* are used. Filters 1621*a*-1621*d* combine input beams at different wavelengths into each output fiber 1611. Lens 1612 reduces the size of the output optical beam and decreases the optical loss from the input fibers 1601-1604 to output fibers 1611. In an alternate embodiment, lens 1612 is between mirrors 1617*a*-1617*d* and filters 1621*a*-1621*d*. In another embodiment, the switch input fibers 1601-1604 also are multi-mode optical fiber, and are switched using either one array of mirrors 1617*a*-1617*d* or using two arrays of mirrors to couple the light from multimode input fibers to multimode output fibers. The input beams at the different wavelengths are collimated by collimating lens array 1642.

Figure 17:
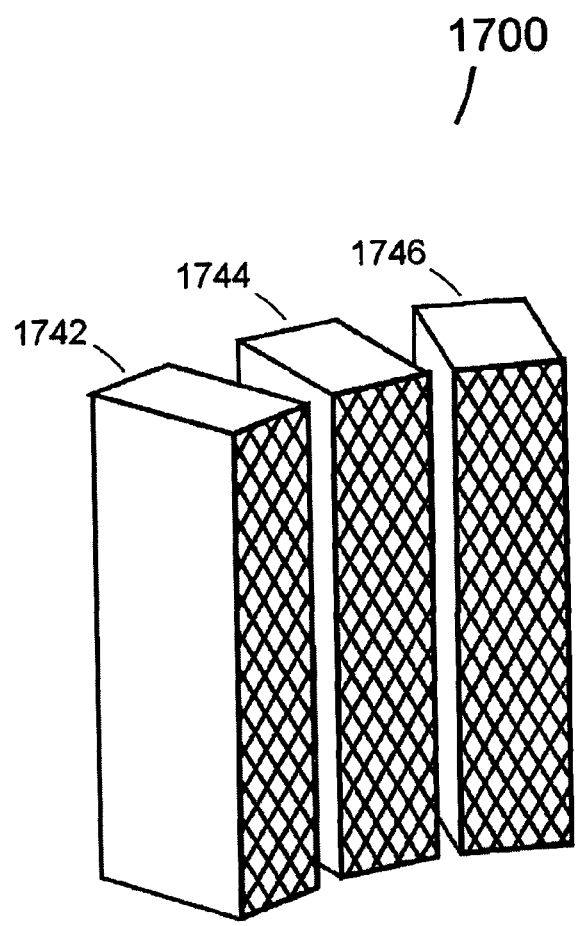
FIG. 17 illustrates an alternative embodiment of a collimator with nonparallel input beams to minimize required mirror rotation angles.

The mirror rotation angles needed to provide switching from any input fiber to any output fiber may be substantially reduced if the optical beams incident on the input mirror array are not parallel. It will be observed for parallel input optical beams 1001*a* and 1002 of FIG. 10 that the mirror rotation requirements for mirrors 1021*a* on one side of the mirror array are different than rotation requirements for mirrors 1022 on the other side of the mirror array. The maximum required mirror rotation can be decreased by using non-collinear optical beams converging toward each other so as to become more closely spaced at mirror array 1060*a*. The orientation of wavelength collimators 1742, 1744, and 1746 is shown in FIG. 17, where wavelength collimators 1742 and 1746 direct collimated optical beams converging towards the center line defined by the angle of center wavelength collimator 1744. Each wavelength collimator includes single input fibers including 213, 214, 227, 228, and 290 with lens array 242 of FIG. 2 to produce collimated beams, and multiple wavelength fibers including 271, 215, and 229 with lens array 242 and demultiplexers 244 of FIG. 2. Alternatively, fewer or more angled sections can be used. The input beams can be angled together in two dimensions, as well as horizontally as illustrated in FIG. 17. Furthermore, the maximum mirror angle can also be reduced using lenses or curved mirrors in conjunction with switch 700*a* or 700*b* of FIG. 7.

Figure 18:
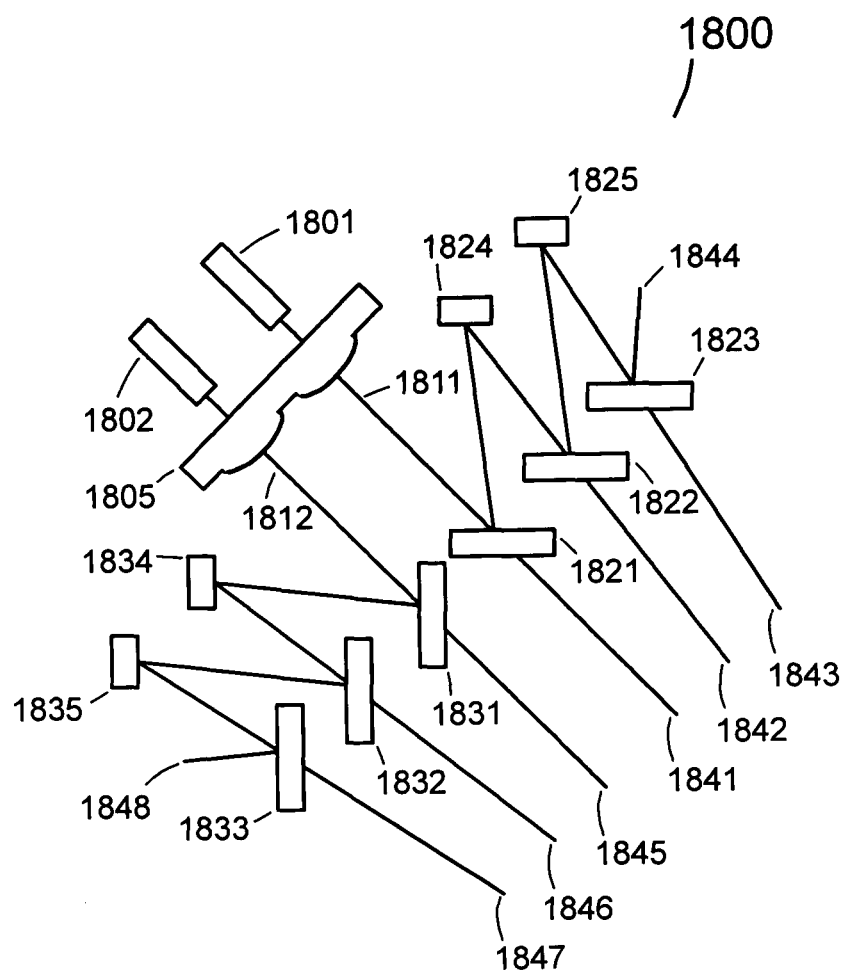
FIG. 18 illustrates an alternative embodiment of a demultiplexer producing noncollinear optical beams.

In addition to making groups of optical beams converge on the mirror array, individual optical beams can be made to converge. In configuration 1800*a* shown in FIG. 18, input fiber 1801 produces a collimated optical beam 1811 using collimating lens array 1805. Optical filter 1821 transmits one optical wavelength to output beam 1841, and reflects the remaining optical wavelengths to mirror 1824 and then to optical filter 1822. Optical filter 1822 transmits an additional wavelength to output beam 1842, and reflects the remaining wavelengths to mirror 1825 and then to optical filter 1823. Optical filter 1823 transmits an additional wavelength to output beam 1843, and reflects the remaining wavelengths to beam 1844 and further filters not shown. Similarly, input 1802 propagating multiple wavelengths is demultiplexed into individual wavelength beams 1845-1847 using optical filters 1831-1833. Mirrors 1824, 1825, 1834, and 1835 and filters 1821-1823 and 1831-1833 are angled to produce a converging array of optical beams. This converging array of beams increases the filter pitch relative to the mirror match, allowing larger filters 1821 that are easier to handle. In addition, the converging array of beams decreases the maximum required mirror rotation angle. In the exemplary embodiment, the center-to-center pitch of filters 1821-1823 is 900 µm and the mirror pitch is 600 µm. Alternatively, other dimensions may be used.

Figure 19:
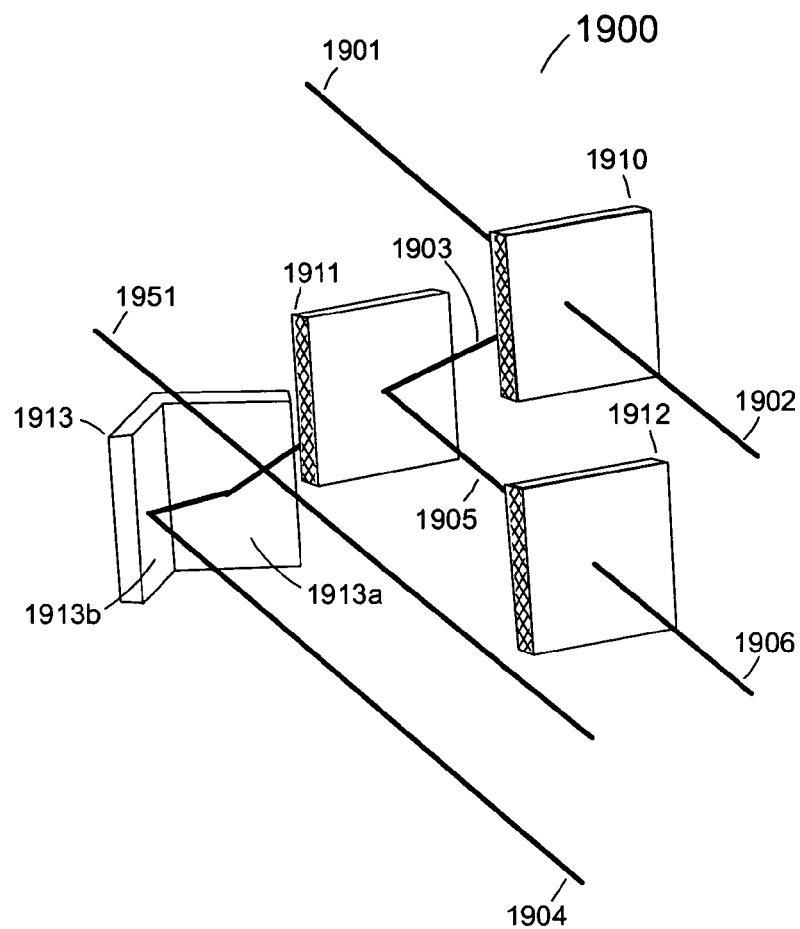
FIG. 19 illustrates an alternative embodiment of a free-space optical demultiplexer having folding mirrors to redirect some beams.

FIG. 19 illustrates an alternative embodiment of a free-space optical demultiplexer having folding mirrors to redirect some beams. Demultiplexer 1900 is an alternative embodiment of the demultiplexer 500 of FIG. 5. In this embodiment, free-space collimated input beam 1901, corresponding to free-space beam 243 of FIG. 2, is incident on optical filter 1910. Filter 1910 passes one wavelength 1902, and reflects beam 1903 with the remaining wavelengths. Beam 1903 is incident on filter 1911, which passes one optical wavelength in beam 1904, and reflects the remaining wavelengths in beam 1905. Beam 1905 is incident on filter 1912, which passes one optical wavelength in beam 1906, and reflects the other optical wavelengths in a beam not shown. In one embodiment, six optical filters are needed to separate the six wavelengths, although only three filters are shown in FIG. 19 for clarity. Alternatively, other numbers of optical filters may be used.

Optical beam 1904 passes through optical filter 1911 traveling in the opposite direction from beams 1902 and 1906. Corner reflector 1913 redirects beam 1904 with two reflections, with the first reflection from reflector face 1913*a* and the second reflection from reflector face 1913*b*. In one embodiment, additional optical beams 1951 propagating a single optical wavelength to other mirrors also pass nearby the optical demultiplexer filters. In this embodiment, each optical beam 1951 carries individual wavelengths from demultiplexers 251 shown as optical beam 248 in FIG. 2. Alternately, beam 1951 may also carry wavelength independent inputs 291 of FIG. 2.

In the foregoing specification, the invention has been described with reference to specific exemplary embodiments thereof. It will, however, be evident that various modifications and changes may be made thereto without departing from the broader spirit and scope of embodiments of the invention as set forth in the appended claims. The specification and drawings are, accordingly, to be regarded in an illustrative sense rather than a restrictive sense.

What is claimed is:

1. A wavelength-selective switch, comprising:
    a plurality of input fibers, each propagating multiple optical wavelengths;
    a plurality of input collimating lenses, each of the plurality of input collimating lenses coupled to a corresponding one of the plurality of input fibers;
    a plurality of demultiplexers, each coupled to a corresponding one of the plurality of input collimating lenses, wherein each of the plurality of demultiplexers comprises a plurality of optical interference filters having a stack of layers with different dielectric constants to produce multiple free-space optical beams at different optical wavelengths;
    a free space optical switch coupled to the plurality of demultiplexers, the free space optical switch having free-space optical beam inputs and free-space optical beam outputs and an input array of mirrors that rotate in two axes;
    an output array of mirrors that rotate in two axes; and
    a plurality of multiplexers coupled to the free space optical switch, wherein each of the plurality of multiplexers comprises a plurality of optical interference filters having a stack of layers with different dielectric constants coupled to receive at least one of the multiple free-space optical beams from the free space optical beam outputs of the free space optical switch.

2. The wavelength-selective switch of claim 1, further comprising:
    a plurality of output lenses, each coupled to a corresponding of the plurality of multiplexers; and
    a plurality of output fibers, each coupled to one of the plurality output lenses, wherein each of the plurality of output lenses couples a corresponding of the multiple free-space beams into a corresponding one of the plurality of output optical fibers.

3. The wavelength-selective switch of claim 2, wherein two or more of the plurality of optical filters having different wavelengths are disposed on a single filter substrate.

4. The wavelength-selective switch of claim 2, wherein the plurality of optical filters of the plurality of demultiplexer are configured to propagate the multiple free-space optical beams in two or more directions, and wherein each of the plurality of demultiplexers further comprise a reflector to change a direction of at least one of the multiple free-space optical beams.

5. The wavelength-selective switch of claim 2, wherein the multiple free-space optical beams from the plurality of demultiplexers are configured to match yielded ports of the free space optical switch.

6. The wavelength-selective switch of claim 2, further comprising:
    a plurality of additional optical lenses wherein each of the plurality of additional optical lenses to change a size of a corresponding one of the multiple free-space optical beams between a corresponding one of the plurality of demultiplexers and the free space optical switch.

7. The wavelength-selective switch of claim 2, further comprising a plurality of additional optical lenses to change the size of the free-space optical beams between the switch and the multiplexer.

8. The wavelength-selective switch of claim 2, wherein the input array of mirrors and output array of mirrors is formed from a single array of mirrors that rotate in two axes; and an optical reflector.

9. The wavelength-selective switch of claim 2, wherein the free space optical switch comprises input switch ports coupled to the plurality of input fibers without passing through a wavelength-selective demultiplexer.

10. The wavelength-selective switch of claim 2, wherein the free space optical switch comprises output switch ports coupled to the plurality of output fibers without passing through a wavelength-selective multiplexer.

\* \* \* \* \*